United States Patent

[11] 3,628,176

[72] Inventor Gustav K. Medicus
   7521 W. Hyland Ave., Dayton, Ohio 45424
[21] Appl. No. 392,968
[22] Filed Aug. 28, 1964
[45] Patented Dec. 14, 1971

[54] DIRECT CURRENT GAS LASERS
   12 Claims, 9 Drawing Figs.
[52] U.S. Cl. ..................................................... 331/94.5
[51] Int. Cl. ..................................................... H01s 3/02
[50] Field of Search ......................................... 331/94.5;
                                                              330/4.3

[56]                References Cited
           UNITED STATES PATENTS
3,242,439  3/1966  Rigden et al. ................. 331/94.5
3,321,714  5/1967  Tien ............................. 331/94.5

FOREIGN PATENTS
1,347,722  11/1963  France ........................ 331/94.5

OTHER REFERENCES
Gordon et al., Gas Pumping in Continuously Operated Ion Lasers. Bell System Technical Journal, Vol. XLIII, No. 4, (July 1964) pp. 1827– 1829.

*Primary Examiner*—William L. Sikes
*Attorneys*—Wade Koontz and Louis E. Hay

ABSTRACT: A direct current excited gas laser containing a mixture of two gases having a relatively large molecular mass ratio, and having backflow passage means for the return flow and neutralization of the heavier gas concentrating at the cathode end of the laser because of electrocataphoretic separation of the mixed gases within the laser tube during normal operation.

Patented Dec. 14, 1971
3,628,176
2 Sheets-Sheet 1
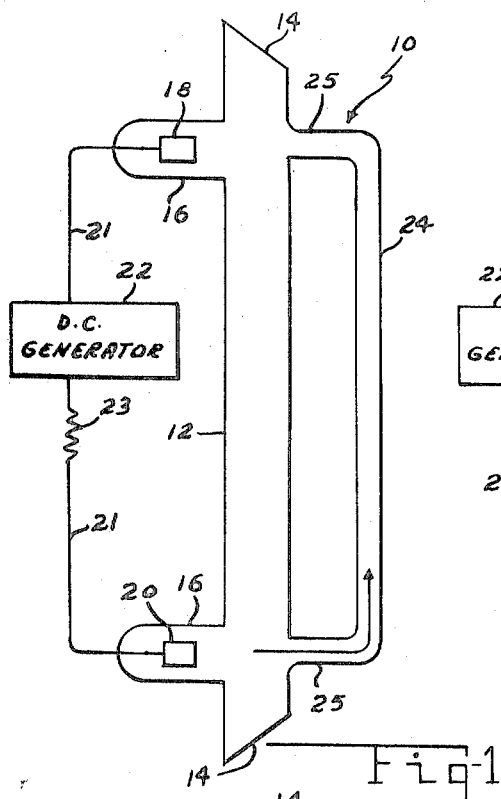
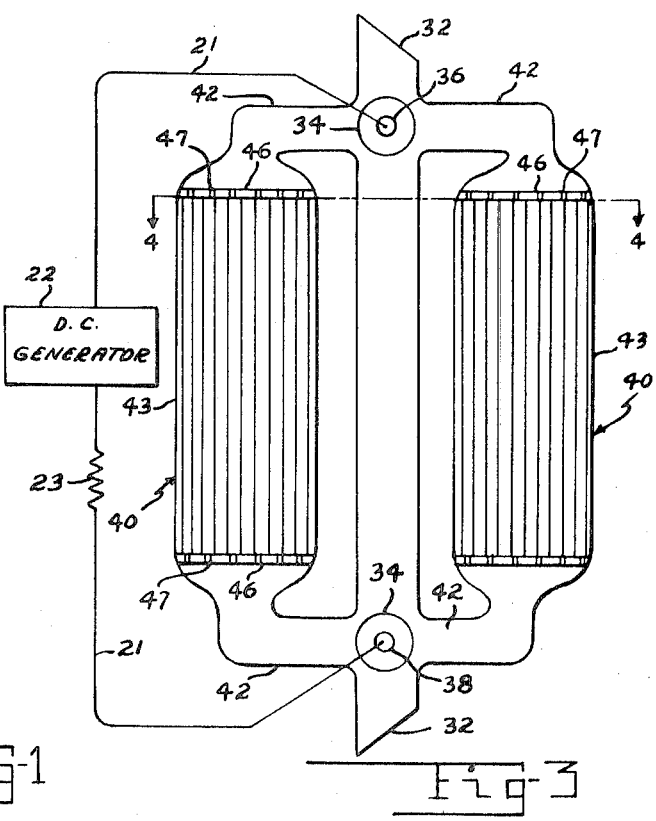
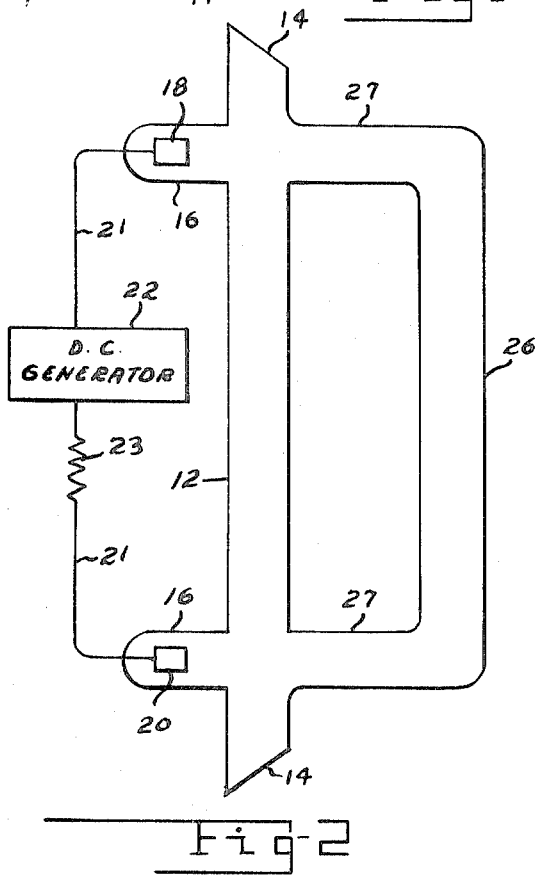
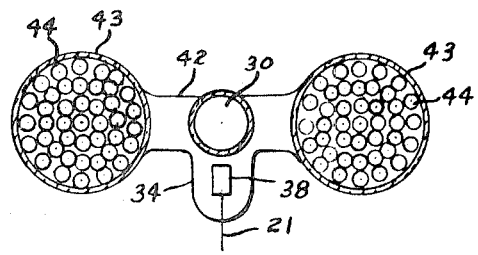
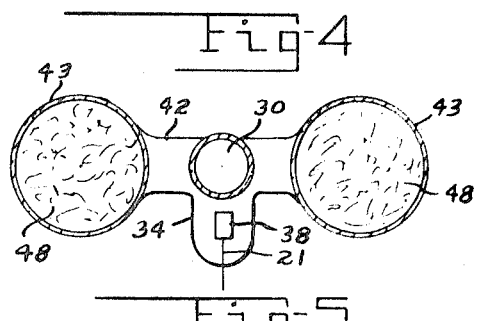
INVENTOR
GUSTAV K. MEDICUS
BY Wade Koontz
Louis E. Say
ATTORNEYS

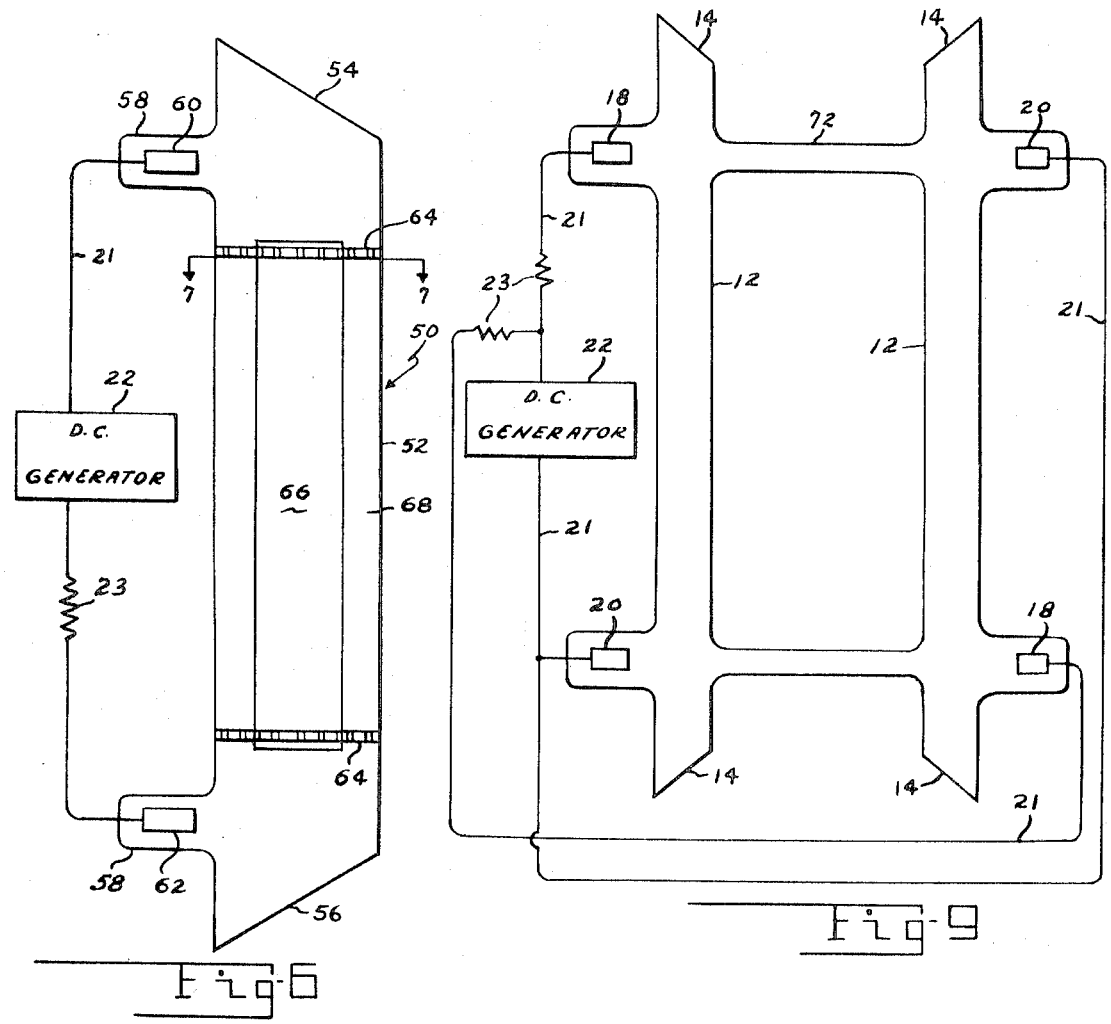

DIRECT CURRENT GAS LASERS

The invention described herein may be manufactured and used by or for the government for governmental purposes without the payment to me of any royalty thereon.

This invention relates to laser devices, and more specifically to gas lasers. Gas lasers excited by alternating current have been successfully employed; however, heretofore certain types of gas lasers excited by direct current have not been completely successful, primarily because of gas separation.

When a gas mixture, comprising a light and a heavy gas in combination, is confined in a suitable containing vessel and is excited by a direct current, the gases tend to separate in the sense that the density of the heavier gas increases at the cathodic end of the discharge. For large molecular mass ratios, such as with xenon-hydrogen, the gas atoms of the constituent gases will attain nearly complete separation after a period of operation. This separation is known as electrocataphoretic separation. The laser action of such a device will cease long before a complete separation if the gases is reached. Typical gas combinations include helium-xenon, neon-xenon, or metal vapors in combination with helium, neon or hydrogen.

Direct current excitation of a gaseous laser is preferable over alternating current excitation because of improved characteristics; the specific object of this invention being to provide gas laser devices which are operable over prolong periods under direct current excitation. According to this invention, the cataphoretic separation of the confined gas mixture is practically eliminated by providing a backflow conduit between the cathodic and the anodic ends of the laser tube in such manner that the backflow channel is free of electric discharge.

Additional objects, advantages and features of the invention reside in the construction, arrangement and combination of parts involved in the embodiments of the invention as will appear from the following description and accompanying drawings, wherein FIG. 1 is a first embodiment of the invention, FIG. 2 is a second embodiment of the invention, FIG. 3 is a third embodiment of the invention, FIG. 4 is a section taken along the line 4—4 of FIG. 3 and showing the third embodiment employing glass tubes, FIG. 5 is a section similar to FIG. 4 and showing the third embodiment employing glass wool, FIG. 6 is a fourth embodiment of the invention, FIG. 7 is a section taken along line 7—7 of FIG. 6 and showing the fourth embodiment employing glass tubes, FIG. 8 is a section similar to FIG. 7 and showing the fourth embodiment employing glass wool, and FIG. 9 is a fifth embodiment of the invention.

Referring to FIG. 1, which depicts the first embodiment of the invention, the gas laser 10 is preferably constructed of glass and has a laser tube 12. This laser tube, which is preferably of circular cross section, terminates in closed ends 14 at an angle with the longitudinal axis through the laser tube. The angle of the closed ends, which is known as the Brewster Angle, is dependent upon the wavelength of the emitted light, which, in turn, is dependent upon the specific gases confined within the laser apparatus. The Brewster Angle and its method of determination are well known to the art and will not be discussed further.

The gas laser depicted is used with a suitable external mirror system (not shown) which is well known and does not constitute a portion of the invention. If desired, the ends 14 of the laser tube may be substantially normal to the longitudinal axis, in which case inside mirrors may be built into the laser in lieu of the external mirror system. The construction depicted on the drawings is the preferable method since it presents the least problems in the manufacture of lasers. The ends may be sloped in opposite directions, as shown on part of the figures, or the ends may be made parallel, as is also shown on other figures.

An elongated closed end terminal tube 16 extends from each end portion of the laser tube. As shown on FIG. 1, the terminal tube 16 is substantially normal to the longitudinal axis through the laser tube 12. The longitudinal axis of the terminal tube may be at any convenient angle, as for example: on FIG. 6; the important consideration being to prevent interference with the laser beam. One of the terminal tubes contains a suitable anode 18, and the other terminal tube contains a suitable cathode 20. The inner open end of each terminal tube communicates with the interior of the laser tube, thus establishing a flow passage between anode and cathode through the laser tube. The anode and the cathode are each provided with connecting means, such as wires 21 passing through the terminal tubes, for connecting to a suitable direct current power supply such as a direct current generator 22 in series with a current-limiting resistor 23.

A backflow tube 24, having open end sidearms 25, is joined to the laser tube with the open end sidearms longitudinally proximate with the anode and the cathode. The backflow tube has a cross-sectional area substantially less than the cross-sectional area of the laser tube. The entire structure is filled with a selected gas mixture after which it is sealed in a manner well known to the art.

In operation, as the confined gas is excited, the heavier gas tends to separate and concentrate as the cathodic end of the laser tube. The backflow tube 24 provides a return passage through which the heavier gas may flow in the direction indicated by the arrow and reenter the anodic end of the laser tube. It is thus seen that the backflow tube provides a means for reuniting the separated gases to permit prolonged operation of the laser. The backflow tube must have smaller internal cross-sectional area than the laser tube in order to prevent electrical discharge through the backflow tube. Although only one backflow tube is shown in FIG. 1, any number of such tubes may be used. The only limitation is that each such tube must have a cross-sectional area less than that of the laser tube.

The second embodiment of the invention, as depicted by FIG. 2, is similar to the embodiment of FIG. 1 and like elements have like numbers. The embodiments are the same except for the backflow tubes. The backflow tubes 26 may have a cross-sectional area as large as that of the laser tube 12, so long as its provides a longer flow path between anode and cathode than the flow path in the laser tube. The length of the flow path is easily controlled by the length of the sidearms 27. So long as the shortest path between anode and cathode is within the laser tube, the electrical discharge will occur within the laser tube.

The third embodiment of this invention is depicted by FIG. 3, FIG. 4 and FIG. 5. This embodiment has an elongated laser tube 30 having closed ends 32 and is constructed in the manner of the embodiment shown in FIG. 1. The laser tube, near each end region, has a closed end elongated terminal tube 34; one of the terminal tubes containing an anode 36 and the other terminal tube containing a cathode 38. The inner open end of each terminal tube communicates with the interior of the laser tube, thus establishing a flow passage between anode and cathode through the laser tube. The anode and cathode are each provided with connecting means, such as wires 21 passing through the terminal tubes, for connecting to direct current generator 22 in series with a current limiting resistor 23.

A plurality of backflow tubes are joined to the laser tube in the manner described for the first embodiment of FIG. 1. As illustrated on FIG. 3, two backflow tubes 40 are straddle joined to the laser tube through open end sidearms 42. Each backflow tube has an elongated central portion 43 which tapers at each end into an adjacent sidearm 42. As best shown on FIG. 4 and FIG. 5, each elongated central portion 43 is of a cross-sectional area substantially greater than the cross-sectional area of the laser tube. The interior of the elongated central portion 43 of each backflow tube is stacked with a plurality of elongated open end tubes 44 as best illustrated by FIG. 4.

Each of the tubes 44 is of a cross-sectional area much smaller than the cross-sectional area of the laser tube 30, and enough tubes are stacked together to place the tubes in contiguous relationship and thus establish flow passages between tubes which have a cross-sectional area substantially less than the cross-sectional area of the laser tube. It is noted that each of the backflow tubes 40 contains a multiplicity of flow passages comprising the interior of each tube 44 and also passages between adjacent tubes. One particular advantage of this embodiment is that expansion stresses are more uniformly distributed because of the balanced configuration. The tubes 44 may be retained in the position shown in by several methods. One method is to fuse the tubes into a bundle before they are installed in the apparatus during its construction by the glass blower. The outer tubes in the bundle rest against the tapering ends of the elongated central portion of the backflow tube; thus retaining the entire bundle in position. A second method, where a rigid structure is desired, is to fuze at least a portion of the outer tubes of the fused bundle against the inner wall of the elongated central portion of each backflow tube. A third manner of retaining tubes 44 is to insert pierced grids 46 as shown on FIG. 3. Each grid contains a multiplicity of pores of small holes 47. One grid is used at each tapered end of the elongated central portion of the backflow tubes. When pierced grids are used, it is not necessary to fuze the tubes 44 into a bundle. The tubes may be stacked to be disposed between the pierced grids which rest in the taper portion of the back flow tube and thus axially support the tubes 44. The pierced grids may be made from ceramics or glass, or may be made from any metallic or nonmetallic material chemically inert to the gas within the laser. The tubes 44 may be replaced by glass wool 48 as shown on FIG. 5. The glass wool divides the interior of the back flow tubes into many minute passages suitable for the prescribed purpose.

The fourth embodiment of this invention is depicted by FIG. 6, FIG. 7 and FIG. 8. This embodiment has an outer shell member 50 comprising an elongated hollow central tube 52, a first closed end 54 closing one end of the central tube, and a second closed end 56 closing the opposite end of the central tube. The closed ends 54 and 56 are at an angle as in the embodiments previously described. Two closed end elongated terminal tubes 58 are joined to the elongated central tube; one terminal tube being joined at each end to be longitudinally inward from the closed ends thereon and with the longitudinal axis of each terminal tube at an angle with the longitudinal axis of the outer shell member. The interior of each terminal tube is in communication with the interior of the outer shell member. One of the terminal tubes 58 contains an anode 60, and the other terminal tube contains a cathode 62. The anode and the cathode are each provided with connecting means, such as wires 21 passing through the terminal tubes, for connecting to direct current generator 22. As with the other embodiments, a current-limiting resistor 23 is used in the electrical circuit.

Two pierced grids 64, similar to the pierced grid 46 previously described, are contained within the outer shell member. The grids are longitudinally separated to be near the opposing ends of the outer shell member longitudinally inward from the terminal tubes.

The outer edge of each pierced grid is joined to the interior wall of the outer shell member. An elongated central laser tube 66, which is open at both ends, is supported by an axially extends through the grids to be coaxial with the outer shell member 50.

A plurality of elongated open end tubes 68 are nested within the elongated central tube 52 of the outer shell member in a manner to be disposed between pierced grids 64 and completely surrounding the central laser tube 66. As in the previous embodiment of FIG. 3, the internal cross-sectional area of the central laser tube 66 is much greater than the internal cross-sectional area of each open end tube 68 and the longitudinal passages between adjacent tubes 68. The elongated open end tubes 68 may be replaced by glass wool 70 as shown on FIG. 8. Furthermore, the pierced grids may be omitted and the tubes, including the central laser tube may be joined by the fuzing method previously described.

The fifth embodiment of this invention is depicted by FIG. 9. This embodiment is essentially the compounding of the first embodiment depicted by FIG. 1, and, therefore, like elements have like numerals. Any number of laser tubes 12 may be joined; however, an even number is preferable for ease of manufacture. It will be noted that each backflow tube 72 joins the anode end of one laser tube to the cathode end of an adjacent laser tube. Any of the previously described backflow tubes may be used; however, for the sake of a compact structure and manufacturing ease, each backflow tube 72 is preferably of the type in which the internal cross-sectional area is less than the internal cross-sectional area of the laser tubes.

It is to be understood that the embodiments of the present invention as shown and described are to be regarded as illustrative only and that the invention is susceptible to variations, modifications and changes within the scope of the appended claims.

I claim:

1. In a direct current excited gas laser including a negative temperature medium and an energy abstracting means, the improvement comprising; an elongated hollow laser tube having a first closed end and a second closed end; a first hollow elongated closed end terminal tube extending from said laser tube near the first closed end of said laser tube and with the longitudinal axis of said first terminal tube at an angle with the longitudinal axis of said laser tube, the interior of said first terminal tube being in communication with the interior of said laser tube; a second hollow elongated closed end terminal tube extending from said laser tube near the second closed end of said laser tube and with the longitudinal axis of said second terminal tube at an angle with the longitudinal axis of said laser tube, the interior of said second terminal tube being in communication with the interior of said laser tube; an anode within said first terminal tube; a cathode within said second terminal tube; said anode and said cathode having connecting means extending through said first and second terminal tubes for joining said anode and said cathode to a direct current power supply; and at least one hollow backflow tube each having a first open end joined to and communicating with said laser tube longitudinally proximate to said first terminal tube and a second open end joined to and communicating with said laser tube longitudinally proximate to said terminal tube and providing a passage for the return flow and neutralization of the heavy gas concentrating at said cathode during normal operation of said laser; the internal cross-sectional area of said laser tube being greater than the internal cross-sectional area of each of said backflow tubes.

2. In a direct current excited gas laser including a negative temperature medium and an energy abstracting means, the improvement comprising: an elongated hollow laser tube having a first closed end and a second closed end; a first hollow elongated closed end terminal tube extending from said laser tube near the first closed end of said laser tube and with the longitudinal axis of said first terminal tube at an angle with the longitudinal axis of said laser tube, the interior of said first terminal being in communication with the interior of said laser tube; a second hollow elongated closed end terminal tube extending from said laser tube near the second closed end of said laser tube and with the longitudinal axis of said second terminal tube at an angle with the longitudinal axis of said second laser tube, the interior of said second terminal tube being in communication with the interior of said laser tube; an anode within said first terminal tube; a cathode within said second terminal tube; said anode and said cathode having connecting means extending through said first and second terminal tubes for joining said anode and said cathode to a direct current power supply; a plurality of hollow backflow tubes each having an elongated central portion having an internal cross-sectional area greater than the internal cross-sectional area of said laser tube and tapering to terminate at each end in reduced diameter sidearms one of which is joined to and communicating with said laser tube longitudinally proximate to said first terminal tube and the other joined to and communicating with said laser tube longitudinally proximate to said second terminal tube; and dividing means within the elongated central portion of each of said backflow tubes for dividing the elongated central portion into a plurality of flow passages each having an internal cross-sectional area less than the internal cross-sectional area of said laser tube; each of said backflow tubes providing a passage for the return flow and neutralization of the heavy gas concentrating at said cathode during normal operation of said laser.

3. A direct current excited gas laser in accordance with claim 2 and in which said dividing means within the elongated central portion of each of said backflow tubes for dividing the elongated central portion into a plurality of flow passages is glass wool.

4. In a direct current excited gas laser including a negative temperature medium and an energy abstracting means, the improvement comprising: an elongated hollow laser tube having a first closed end and a second closed end; a first hollow elongated closed end terminal tube extending from said laser tube near the first closed end of said laser tube and with the longitudinal axis of said first terminal tube at an angle with the longitudinal axis of said laser tube, the interior of said first terminal tube being in communication with the interior of said laser tube; a second hollow elongated closed end terminal tube extending from said laser tube near the second closed end of said laser tube and with the longitudinal axis of said second terminal tube at an angle with the longitudinal axis of said laser tube, the interior of said second terminal tube being in communication with the interior of said laser tube; an anode within said first terminal tube; a cathode within said second terminal tube; said anode and said cathode having connecting means extending through said first and said second terminal tubes for joining said anode and said cathode to a direct current power supply; a plurality of hollow backflow tubes each having an elongated central portion having an internal cross-sectional area greater than the internal cross-sectional area of said laser tube and tapering to terminate at each end in reduced diameter sidearms one of which is joined to and communicating with said laser tube longitudinally proximate to said first terminal tube and the other joined to and communicating with said laser tube longitudinally proximate to said first terminal tube; and a plurality of elongated open end tubes nested in parallel relationship within and to the elongated central portion of each of said backflow tubes; adjacent elongated open end tubes being longitudinally joined and at least a portion of said elongated open end tubes adjacent to the inner wall of the elongated portion of said backflow tube being joined thereto to provide a rigid structure having a plurality of flow passages through and between adjacent open end tubes, each of which has an internal cross-sectional area less than the internal cross-sectional area of said laser tube; each of said backflow tubes providing a passage for the return flow and neutralization of the heavy gas concentrating at said cathode during normal operation of said laser.

5. In a direct current excited gas laser including a negative temperature medium and an energy abstracting means, the improvement comprising: an elongated hollow laser tube having a first closed end and a second closed end; a first hollow elongated closed end terminal tube extending from said laser tube near the first closed end of said laser tube and with the longitudinal axis of said first terminal tube at an angle with the longitudinal axis of said laser tube, the interior of said first terminal tube being in communication with the interior of said laser tube; a second hollow elongated closed end terminal tube extending from said laser tube near the second closed end of said laser tube and with the longitudinal axis of said second terminal tube at an angle with the longitudinal axis of said laser tube, the interior of said second terminal tube being in communication with the interior of said laser tube; an anode within said first terminal tube; a cathode within said second terminal tube; said anode and said cathode having connecting means extending through said first and said second terminal tubes for joining said anode and said cathode to a direct current power supply; a plurality of hollow backflow tubes each having an elongated central portion having an internal cross sectional area greater than the internal cross-sectional area of said laser tube and tapering to terminate at each end in reduced diameter sidearms one of which is joined to and communicating with said laser tube longitudinally proximate to said first terminal tube and the other joined to and communicating with said laser tube longitudinally proximate to said second terminal tube; two pierced grids chemically inert to the gas to be used within the laser, one each of said pierced grids being nested within and engaging the tapering portion at each end of the elongated central portion of each of said hollow backflow tubes; and a plurality of elongated open end tubes nested in parallel relationship within and to the elongated central portion of each of said backflow tubes to be disposed between said pierced grids to provide a plurality of flow passages through and between adjacent open end tubes, each of which has a cross-sectional area less than the internal cross-sectional area of said laser tube; each of said backflow tubes providing a passage for the return flow and neutralization of the heavy gas concentrating at said cathode during normal operation of said laser.

6. In a direct current excited gas laser including a negative temperature medium and an energy abstracting means, the improvement comprising: an elongated hollow laser tube having a first closed end and a second closed end; a first hollow elongated closed end terminal tube extending from said laser tube near the first closed end of said laser tube and with the longitudinal axis of said first terminal tube at an angle with the longitudinal axis of said laser tube, the interior of said first terminal tube being in communication with the interior of said laser tube; a second hollow elongated closed end terminal tube extending from said laser tube near the second closed end of said laser tube and with the longitudinal axis of said second terminal tube at an angle with the longitudinal axis of said laser tube, the interior of said second terminal tube being in communication with the interior of said laser tube; an anode within said first terminal tube; a cathode within said second terminal tube; said anode and said cathode having connecting means extending through said first and said second terminal tubes for joining said anode and said cathode to a direct current power supply; a plurality of hollow backflow tubes each having an elongated central portion having an internal cross-sectional area greater than the internal cross-sectional area of said laser tube and tapering to terminate at each end in reduced diameter sidearms one of which is joined to and communicating with said laser tube longitudinally proximate to said first terminal tube and the other joined to and communicating with said laser tube longitudinally proximate to said second terminal tube; and a plurality of elongated open end tubes nested in parallel relationship within and to the elongated central portion of each of said backflow tubes, adjacent elongated open end tubes being longitudinally joined and at least a portion of said elongated open end tubes adjacent to the inner wall of the elongated portion of said backflow tube engaging the tapering portion at each end of the elongated central portion of each of said hollow backflow tubes, said elongated open end tubes providing a plurality of flow passages through and between adjacent open end tubes with each passage having a cross-sectional area less than the internal cross-sectional area of said laser tube; each of said backflow tubes providing a passage for the return flow and neutralization of the heavy gas concentrating at said cathode during normal operation of said laser.

7. In a direct current excited gas laser including a negative temperature medium and an energy abstracting means, the improvement comprising: an outer shell member comprising an elongated hollow central tube, and a second closed end closing one end of the central tube, and a second closed end closing the opposite end of the central tube; a first hollow elongated closed end terminal tube extending from said central tube near the first closed end thereon and with the interior of said first terminal tube in communication with the interior of said outer shell member, the longitudinal axis of said first terminal tube being at an angle with the longitudinal axis of said outer shell member; a second hollow elongated closed end terminal tube extending from said central tube near the second closed end thereon and with the interior of said second terminal tube in communication with the interior of said outer shell member, the longitudinal axis of said second terminal tube being at an angle with the longitudinal axis of said outer shell member; an anode within said first terminal tube; a cathode within said terminal tube; said anode and said cathode having connecting means extending through said first and second terminal tubes for joining said anode and said cathode to a direct current power supply; and elongated central laser tube having open ends, said central laser tube being coaxially within said outer shell member and with the open ends of said central laser tube being longitudinally inward from said anode and said cathode; and dividing support means within said outer shell member for supporting said central laser tube in position and for dividing the opening between the inner wall of said outer shell member and said central laser tube into a plurality of flow passages, the internal cross-sectional area of said central laser tube being greater than the cross-sectional area of each flow passages formed by said dividing support means; the flow passages formed by said dividing support means providing for the return flow and neutralization of the heavy gas concentrating at said cathode during normal operation of said laser.

8. A direct current excited gas laser in accordance with claim 7 and in which said dividing support comprises:
   a. two pierced grids longitudinally separated within said outer shell member and having the outer edge thereof joined to the interior wall of said outer shell member, said pierced grids each having an axial bore receiving and supporting one end of said central laser tube, and
   b. glass wool disposed between said pierced grids and surrounding said central laser tube.

9. A direct current excited gas laser in accordance with claim 7 and in which said dividing support comprises:
   a. two pierced grids longitudinally separated within said outer shell and having the outer edge thereof joined to the interior wall of said outer shell member, said pierced grids each having an axial bore receiving and supporting one end of said central laser tube, and
   b. a plurality of elongated open end tubes within said outer shell member disposed between said pierced grids and surrounding said central laser tube.

10. A direct current excited gas laser in accordance with claim 7 and in which said dividing support comprises:
    a plurality of elongated open end tubes within said outer shell member and surrounding said central laser tube with adjacent open end tubes being longitudinally joined to each other and to said adjacent central laser tube, and further having at least a portion of said open end tubes adjacent to the inner wall of said outer shell member joined thereto.

11. In a direct current excited gas laser including a negative temperature medium and an energy abstracting means, the improvement comprising: a plurality of elongated hollow laser tubes each having a first closed end and a second closed end; a first terminal tube extending from each of said laser tubes near the first closed end thereof and with the longitudinal axis of said first terminal tube at an angle with the longitudinal axis of said laser tube to which joined, the interior of said first terminal tube being in communication with the interior of said laser tube; a second terminal tube extending from each of said laser tubes near the second closed end thereof and with the longitudinal axis of said second terminal tube at an angle with the longitudinal axis of said laser tube to which is joined, the interior of said second terminal tube being in communication with the interior of said laser tube; an anode within each of said first terminal tubes; a cathode within each of said second terminal tubes; each of said anodes and each of said cathodes having connecting means extending through said first and second terminal tubes for joining said anodes and said cathodes to a direct current power supply; and a plurality of passage means, one each of which joins the anode end on one of said laser tubes to the cathode end on an adjacent said laser tube to provide passages for the return flow and neutralization of the heavy gas concentrating at said cathodes during normal operation of said laser.

12. In a direct current excited gas laser including a negative temperature medium and an energy abstracting means, the improvement comprising: a plurality of elongated hollow laser tubes each having a first closed end and a second closed end; a first terminal tube extending from each of said laser tubes near the first closed end thereof and with the longitudinal axis of said first terminal tube at an angle with the longitudinal axis of said laser tube to which joined, the interior os said first terminal tube being in communication with the interior of said laser tube; a second terminal tube extending from each of said laser tubes near the second closed end thereof and with the longitudinal axis of said second terminal tube at an angle with the longitudinal axis of said laser tube to which joined, the interior of said second terminal tube being in communication with the interior of said laser tube; an anode within each of said first terminal tubes; a cathode within each of said second terminal tubes, each of said anodes and each of said cathodes having connecting means extending through said first and said second terminal tubes for joining said anodes and said cathodes to a direct current power supply; and a plurality of backflow tubes each having a first open end joined to and communicating with one of said laser tubes longitudinally proximate to said first terminal tube thereon, and a second open end joined to and communicating with an adjacent said laser tube longitudinally proximate to said second terminal tube thereon and providing a passage for the return flow and neutralization of the heavy gas concentrating at said cathodes during normal operation of said laser; the internal cross-sectional area of each of said laser tubes being greater than the internal cross-sectional area of each of said backflow tubes.

* * * * *